United States Patent
Lee et al.

(10) Patent No.: US 7,236,458 B2
(45) Date of Patent: Jun. 26, 2007

(54) METHOD FOR MONITORING TRAFFIC IN PACKET SWITCHED NETWORK

(75) Inventors: Jae-Hwoon Lee, Seoul (KR);
Byung-Gu Choe, Seoul (KR);
Byung-Chang Kang, Seoul (KR);
Eun-Young Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 986 days.

(21) Appl. No.: 10/421,953

(22) Filed: Apr. 24, 2003

(65) Prior Publication Data

US 2004/0008625 A1    Jan. 15, 2004

(30) Foreign Application Priority Data

Apr. 24, 2002    (KR)    ............................ 2002-0022586

(51) Int. Cl.
*H04L 12/26* (2006.01)
*H04L 12/56* (2006.01)
*G06F 15/173* (2006.01)

(52) U.S. Cl. .................. 370/230; 370/235.1; 370/412; 709/223

(58) Field of Classification Search ..... 370/230–236.2, 370/389, 392, 394, 412–419; 709/223–229
See application file for complete search history.

(56) References Cited

U.S. PATENT DOCUMENTS 5,533,020 A    7/1996    Byrn et al.

(Continued)

OTHER PUBLICATIONS

Rexford et al., A scalable architecture for fair leaky-bucket shaping, INFOCOM '97. Sixteenth Annual Joint Conference of the IEEE Computer and Communications Societies, Proceedings IEEE vol. 3, Apr. 7-11, 1997, pp. 1054-1062.*

(Continued)

*Primary Examiner*—Chi Pham
*Assistant Examiner*—Tri H. Phan
(74) *Attorney, Agent, or Firm*—Robert E. Bushnell, Esq.

(57) ABSTRACT

A method for monitoring traffic in a packet switched network. The packet switched network includes connections grouped in a single group; token buffers for respectively corresponding to the connections, and storing tokens generated at a predetermined token generation rate by the corresponding connection; a shared token pool for being shared among the connections, and storing the generated tokens therein when each token buffer of each connection is over a predetermined maximum size; and counters for respectively corresponding to the connections, and counting tokens stored in the shared token pool by a corresponding connection. The method for monitoring traffic in the packet switched network includes the steps of: a) providing data buffers for respectively corresponding to the connections and storing a packet of a contract-following connection in case of a temporary deficiency of a network resource; b) if a token buffer of a corresponding connection is over a predetermined maximum size and the shared token pool is over its own predetermined maximum size, storing tokens generated during a token generation time in the shared token pool, and controlling a count value of a corresponding counter; c) checking the count value of the corresponding counter, and selectively controlling a permitted buffer size of a data buffer of a corresponding connection upon receiving the checking result of the count value of the corresponding counter; and d) checking a token buffer of a corresponding connection and a shared token pool if a packet reaches the corresponding connection or is present in a data buffer of the corresponding connection, and selectively storing a received packet in a corresponding data buffer according to a count value of a corresponding counter if there is no token in the token buffer of the corresponding connection and the shared token pool.

28 Claims, 8 Drawing Sheets

U.S. PATENT DOCUMENTS

| | | | |
|---|---|---|---|
| 5,596,576 | A | 1/1997 | Milito |
| 5,835,711 | A | 11/1998 | Chang et al. |
| 6,347,077 | B1 | 2/2002 | Ginzboorg |
| 6,349,088 | B1 | 2/2002 | Ginzboorg et al. |
| 6,388,992 | B2 * | 5/2002 | Aubert et al. ............... 370/232 |
| 6,801,500 | B1 * | 10/2004 | Chandran ................ 370/230.1 |

OTHER PUBLICATIONS

Wong et al., TBLB algorithm for servicing real-time multimedia traffic streams, Multimedia and Expo, 2000. ICME 2000. 2000 IEEE International Conference on vol. 1, Jul. 30-Aug. 2, 2000, pp. 557-560.*

An article by J. Sairmesh and N. Shroff entitled "Limitations and Pitfalls of Leaky Bucket" and "A Study with Video Traffic" in Proceedings of IEEE ICCCN'94, Sep. 1994, pp. 93-98.

"*The Token-Bank Leaky Bucket Mechanism for Group Connections in ATM Networks* " by Sheng-Lin Wu and Wen-Shyen E. Chen, Sep. 1996, pp. 226-233.

"Effectiveness of the 'Leaky Bucket' Policing Mechanism in ATM Networks," *IEEE Journal on Selected Areas in Communications*, vol. 9, No. 3, by M. Butto, E. Cavallero, and A. Tonietti on Apr. 1991, pp. 335-342.

"*ATM User-Network Interface Specification-Version 3.1* " by George Dobrowski on Sep. 1994.

Annex A "*Guidelines for Use of ATM Address Formats*".

Annex B "*Compatibility Checking*".

Annex C "*B-LLI Negotiation*".

Annex D "*Transit Network Selection*".

Annex E "*Cause Definitions*".

Annex F "*ATM Adaption Layer Parameters Negotiation*".

Appendix A "*Quality of Service Guidelines*".

Appendix B "*Conformance Examples in a Traffic Contract*".

Appendix C "*Point-Multipoint Signalling Procedures Using Seperate State Machines(Information)*".

Appendix D "*Examples Signalling Codings*".

Appendix E "*Differences with ITU-T draft Recommendation Q.2931*".

Appendix F "*Guidlines on the use of Bearer Class, Traffic Parameters and QoS*".

Appendix G "*OAM Cell Error Detection Code Field*".

Appendix H "*Glossary*".

* cited by examiner

METHOD FOR MONITORING TRAFFIC IN PACKET SWITCHED NETWORK

CLAIM OF PRIORITY

This application makes reference to, incorporates the same herein, and claims all benefits accruing under 35 U.S.C. §119 from my application METHOD FOR MONITORING TRAFFIC IN PACKET SWITCHING NETWORK filed with the Korean Industrial Property Office on Apr. 24, 2002 and there duly assigned Serial No. 22586/2002.

BACKGROUND OF THE INVENTION

1. Technical Field

The present invention relates to a packet switching network, and more particularly to a method for monitoring traffic in a packet switched network.

2. Related Art

Typically, a packet switched network such as an asynchronous transfer mode (ATM) is a network for integrating data and multimedia traffic into one network. Non-real-time traffic such as data and non-real-time traffic having audio and video signals are different in a quality of service (QoS) requirement. That is, the real-time traffic is very sensitive to data transmission delay, whereas the non-real-time traffic is very sensitive to data loss.

Since several streams of traffic having different quality of service (QoS) requirements share one source by adopting a statistical multiplexing method in the packet switched network, a predetermined network resource should be assigned to a corresponding connection whenever a connection is set up in such a way that the packet switched network satisfies a required quality of service (QoS) of the connection. Network resources include bandwidth, space in buffers, etc. Network resources can be said to be temporarily deficient when congestion occurs.

To reserve a network resource, a traffic source negotiates with a packet switched network using traffic parameters such as a maximum cell transmission rate, an average cell transmission rate, and a maximum burst length, and others. While setting up the connection, the packet switched network determines whether quality of services (QoSs) of prior connections besides the connection are satisfied using a call admission control mechanism, thereby determining a new call admission on the basis of the result. If a new connection is set up by the call admission control mechanism, then a source has to transmit traffic in conformity with the negotiated traffic parameters. However, if the source transmits much more traffic than the negotiated parameters, quality of services (QoSs) of not only the source but also of other sources may be deteriorated, and network congestion may occur.

It would be desirable to reduce the occurrence of network congestion, and it would be desirable to enhance the fair and uniform use of network resources.

SUMMARY OF THE INVENTION

Therefore, the present invention has been made in view of the above problems, and the present invention provides a method for monitoring traffic of a fairness improvement leaky bucket (FILB) algorithm for enabling all connections connected to a packet switched network to fairly use a network resource.

The present invention also provides a traffic monitoring method for performing a statistical multiplexing by adopting several connections as one group in a packet switched network in such a way that connections within the group share a redundant bandwidth not used in other connections to thereby increase bandwidth utility, and being effectively used for data having a bursty characteristic regarded as a disadvantage of a conventional leaky bucket (LB) algorithm.

The present invention also provides a traffic monitoring method for assigning a fair bandwidth to each connection within a group by protecting a connection following a contract from another connection violating the contract, and maintaining the same service rate for all connections.

The present invention also provides a method for monitoring traffic in a packet switched network including a plurality of connections grouped in a single group; a plurality of token buffers for respectively corresponding to the connections, and storing tokens generated at a predetermined token generation rate by the corresponding connection; a shared token pool for being shared among the connections, and storing the generated tokens therein when each token buffer of each connection is over a predetermined maximum size; and a plurality of counters for respectively corresponding to the connections, and counting tokens stored in the shared token pool by a corresponding connection, comprising the steps of: a) providing a plurality of data buffers for respectively corresponding to the connections and storing a packet of a contract-following connection in case of a temporary deficiency of a network resource; b) if a token buffer of a corresponding connection is over a predetermined maximum size and the shared token pool is over its own predetermined maximum size, storing tokens generated during a token generation time in the shared token pool, and controlling a count value of a corresponding counter; c) checking the count value of the corresponding counter, and selectively controlling a permitted buffer size of a data buffer of a corresponding connection upon receiving the checking result of the count value of the corresponding counter; and d) checking a token buffer of a corresponding connection and a shared token pool if a packet reaches the corresponding connection or is present in a data buffer of the corresponding connection, and selectively storing a received packet in a corresponding data buffer according to a count value of a corresponding counter if there is no token in the token buffer of the corresponding connection and the shared token pool.

In accordance with the principles of the present invention, as embodied and broadly described, the present invention provides a method for monitoring traffic in a packet switched network, the method comprising: providing a plurality of connections for a packet switched network, the connections being grouped into a single group, the connections including at least a first connection; providing a plurality of token buffers, each one of the token buffers corresponding to a respective one of the connections, the token buffers including at least a first token buffer storing tokens generated at a predetermined rate by the connection corresponding to the first token buffer, the first token buffer corresponding to the first connection, the first token buffer having a first predetermined maximum size; providing a token pool shared by the connections, the token pool storing tokens generated by the first connection when the first token buffer is filled to the first predetermined maximum size, the token pool having a second predetermined maximum size; providing a plurality of counters, each one of the counters corresponding to a respective one of the connections, the counters including at least a first counter, the first counter corresponding to the first connection and counting tokens stored in the token pool by the first connection; providing a plurality of data buffers, each one of the data buffers corresponding to a respective one of the connections, the data buffers including at least a first data buffer, the first data buffer corresponding to the first connection, the first data buffer storing a packet of the first connection when a network resource is deficient and the first connection is a contract-following connection; when the first token buffer is filled to the first predetermined maximum size and the token pool is not filled to the second predetermined maximum size, storing tokens generated during a token generation time in the token pool and controlling a count value of the first counter, said controlling of the count value being in dependence upon said storing of the tokens generated during the token generation time; detecting the count value of the first counter; selectively controlling a maximum size of the first data buffer in dependence upon the detected count value of the first counter; when a first received packet reaches the first data buffer, checking the first token buffer; when the first received packet reaches the first data buffer and the first token buffer does not contain any tokens, checking the token pool; and when the first received packet reaches the first data buffer and the first token buffer does not contain any tokens and the token pool does not contain any tokens, selectively storing the first received packet in the first data buffer in dependence upon the count value of the first counter.

In accordance with the principles of the present invention, as embodied and broadly described, the present invention additionally provides a method for monitoring traffic in a communication network, the method comprising: generating tokens by a plurality of connections for a communication network, the connections being grouped into a single group, the connections including at least a first connection; providing a plurality of token buffers, each one of the token buffers corresponding to a respective one of the connections, the token buffers including at least a first token buffer storing tokens generated at a predetermined rate by the connection corresponding to the first token buffer, the first token buffer corresponding to the first connection, the first token buffer having a first predetermined maximum size; providing a token pool shared by the connections, the token pool storing tokens generated by the first connection when the first token buffer is filled to the first predetermined maximum size, the token pool having a second predetermined maximum size; providing a plurality of counters, each one of the counters corresponding to a respective one of the connections, the counters including at least a first counter, the first counter corresponding to the first connection and counting tokens stored in the token pool by the first connection; providing a plurality of data buffers, each one of the data buffers corresponding to a respective one of the connections, the data buffers including at least a first data buffer, the first data buffer corresponding to the first connection, the first data buffer storing a packet of the first connection when a network resource is deficient and the first connection is a contract-following connection, the first data buffer having a current size and a maximum size; when the first token buffer is filled to the first predetermined maximum size and the token pool is not filled to the second predetermined maximum size, storing tokens generated during a token generation time in the token pool and selectively controlling a count value of the first counter, said selective controlling of the count value being in dependence upon said storing of the tokens generated during the token generation time; detecting the count value of the first counter and detecting a status of the first data buffer; selectively controlling the maximum size of the first data buffer in dependence upon the count value of the first counter and the status of the first data buffer; checking the first token buffer and the token pool when at least one occurs selected from among a packet being conveyed to the first data buffer and the packet being stored in the first data buffer; when the first token buffer does not contain any tokens and the token pool does contain at least one token, transmitting the packet and removing the at least one token from the token pool and controlling the count value of the first counter and controlling the current size of the first data buffer; and when the first token buffer does not contain any tokens and the token pool does not contain any tokens, selectively storing the packet in the first data buffer in dependence upon the count value of the first counter and the status of the first data buffer.

In accordance with the principles of the present invention, as embodied and broadly described, the present invention also provides a method for monitoring traffic in a packet switched network, the method comprising: providing a plurality of connections for transmitting data in a packet switched network, the connections including at least a first connection; providing a plurality of token buffers, each one of the token buffers corresponding to a respective one of the connections, each one of the token buffers storing tokens generated by the connection corresponding to the respective token buffer, the first token buffer corresponding to the first connection; providing a token pool shared by the connections, the token pool storing tokens generated by the connections when the token buffers are filled to their capacity; providing a plurality of counters, each one of the counters corresponding to a respective one of the connections, each one of the counters counting tokens stored in the token pool by the connection corresponding to the respective counter, the counters including at least a first counter, the first counter corresponding to the first connection and counting tokens stored in the token pool by the first connection; providing a plurality of data buffers, each one of the data buffers corresponding to a respective one of the connections, each one of the data buffers storing a packet of a connection corresponding to the respective data buffer when a network resource is deficient and the first connection is a contract-following connection, the data buffers including at least a first data buffer, the first data buffer corresponding to the first connection; and when the first token buffer is full and the token pool is not full, storing tokens generated during a token generation time in the token pool and selectively controlling a count value of the first counter, said selective controlling of the count value being in dependence upon said storing of the tokens generated during the token generation time.

In accordance with the principles of the present invention, as embodied and broadly described, the present invention furthermore provides a method for monitoring traffic in a communication network, the method comprising: generating tokens by a plurality of connections in a communication network, the plurality of connections including at least a first connection; storing the generated tokens in at least one token buffer selected from among a plurality of token buffers when the at least one token buffer is below a maximum buffer size of the at least one token buffer, each one of the token buffers corresponding to a respective one of the connections, the token buffers including at least a first token buffer, the first token buffer corresponding to the first connection and storing of the tokens generated by the first connection when the first token buffer is below a maximum buffer size; storing the generated tokens in a token pool when at least one of the token buffers is not below its respective maximum buffer size, the token pool storing the tokens generated by the first connection when the first token buffer is not below the maximum buffer size; counting the tokens stored in the token pool, said counting being performed by a plurality of counters, each one of the counters corresponding to a respective one of the connections, the counters including at least a first counter, the first counter counting the tokens stored in the token pool by the first connection; storing traffic units of the connections in a plurality of data buffers, each one of the data buffers corresponding to a respective one of the connections, the data buffers including at least a first data buffer, the first data buffer storing the traffic units of the first connection when a resource of the communication network does not conform to predetermined criteria and the first connection does conform to predetermined traffic parameters; when the first token buffer is not below the maximum buffer size and the token pool is below a maximum pool size, storing tokens generated by the first connection during a token generation time in the token pool and incrementing a count value of the first counter, said incrementing of the count value of the first counter being in dependence upon said storing of the tokens generated during the token generation time; detecting the count value of the first counter; selectively controlling a maximum size of the first data buffer in dependence upon the detected count value of the first counter; and when a first traffic unit of the first connection is stored in the first data buffer and no tokens are stored in the first token buffer and at least one token is stored in the token pool, transmitting the first traffic unit from the first data buffer and removing the at least one token from the token pool and reducing the current size of the first data buffer and controlling the count value of the first counter, said reducing and controlling being performed in dependence upon said transmitting and removing respectively.

In accordance with the principles of the present invention, as embodied and broadly described, the present invention provides a method for monitoring traffic in a communication network, the method comprising: generating tokens by a plurality of connections in a communication network, the plurality of connections including at least a first connection; storing the generated tokens in at least one token buffer selected from among a plurality of token buffers when the at least one token buffer is below a corresponding maximum token buffer size, each one of the token buffers corresponding to a respective one of the connections, the token buffers including at least a first token buffer, the first token buffer corresponding to the first connection and storing of the tokens generated by the first connection when the first token buffer is below a first maximum token buffer size; storing the generated tokens in a token pool when at least one of the token buffers is not below its respective maximum buffer size, the token pool storing the tokens generated by the first connection when the first token buffer is not below the first maximum token buffer size; counting the tokens stored in the token pool, said counting being performed by a plurality of counters, each one of the counters corresponding to a respective one of the connections, the counters including at least a first counter, the first counter counting the tokens stored in the token pool by the first connection; storing traffic units of the connections in a plurality of data buffers, each one of the data buffers corresponding to a respective one of the connections, the data buffers including at least a first data buffer, the first data buffer storing the traffic units of the first connection when a resource of the communication network does not conform to predetermined criteria and the first connection does conform to predetermined traffic parameters; when the first token buffer is not below the first maximum token buffer size and the token pool is below a maximum pool size, storing tokens generated by the first connection during a token generation time in the token pool and decreasing a count value of the first counter by one; checking the count value of the first counter and a status of the first data buffer; when the count value of the first counter is a negative number and a current size of the first data buffer is not below a maximum data buffer size, increasing the maximum data buffer size of the first data buffer by one; when a particular traffic unit corresponds to a traffic unit selected from among a traffic unit reaching the first connection and a traffic unit stored in the first data buffer, and when no tokens are stored in the first token buffer and at least one token is stored in the token pool, transmitting the particular traffic unit and removing the at least one token from the token pool and increasing the count value of the first counter by one and reducing the maximum data buffer size of the first data buffer by one; and when a certain traffic unit reaches the first connection and no tokens are stored in the first token buffer and no tokens are stored in the token pool and the count value of the first counter is a negative number and the first data buffer is below the maximum data buffer size, storing the certain traffic unit in the first data buffer.

In accordance with the principles of the present invention, as embodied and broadly described, the present invention provides an apparatus for monitoring traffic in a communication network, the apparatus comprising: a plurality of connections in a communication network, the plurality of connections generating tokens, the plurality of connections including at least a first connection; a plurality of processors including at least a first processor, each of the processors corresponding to a respective one of the connections; a plurality of token buffers, at least one of the token buffers storing the generated tokens when the at least one token buffer is below a maximum buffer size of the at least one token buffer, each one of the token buffers corresponding to a respective one of the connections, the token buffers including at least a first token buffer, the first token buffer corresponding to the first connection and storing of the tokens generated by the first connection when the first token buffer is below a maximum buffer size; a token pool, the token pool storing the generated tokens when at least one of the token buffers is not below its respective maximum buffer size, the token pool storing the tokens generated by the first connection when the first token buffer is not below the maximum buffer size; a plurality of counters, the plurality of counters counting the tokens stored in the token pool, each one of the counters corresponding to a respective one of the connections, the counters including at least a first counter, the first counter counting the tokens stored in the token pool by the first connection; and a plurality of data buffers, the data buffers storing traffic units of the connections, each one of the data buffers corresponding to a respective one of the connections, the data buffers including at least a first data buffer, the first data buffer storing the traffic units of the first connection when a resource of the communication network does not conform to predetermined criteria and the first connection does conform to predetermined traffic parameters; when the first token buffer is not below the maximum buffer size and the token pool is below a maximum pool size, the token pool storing tokens generated by the first connection during a token generation time and the first counter incrementing a count value of the first counter, said incrementing of the count value of the first counter being in dependence upon said storing of the tokens generated during the token generation time; when a first traffic unit of the first connection is stored in the first data buffer and no tokens are stored in the first token buffer and at least one token is stored in the token pool, the first processor transmitting the first traffic unit from the first data buffer and the at least one token being removed from the token pool and the current size of the first data buffer being reduced and the count value of the first counter being controlled, said reducing and controlling being performed in dependence upon said transmitting and removing respectively.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF EMBODIMENTS FOR CARRYING OUT THE INVENTION

Figure 1:
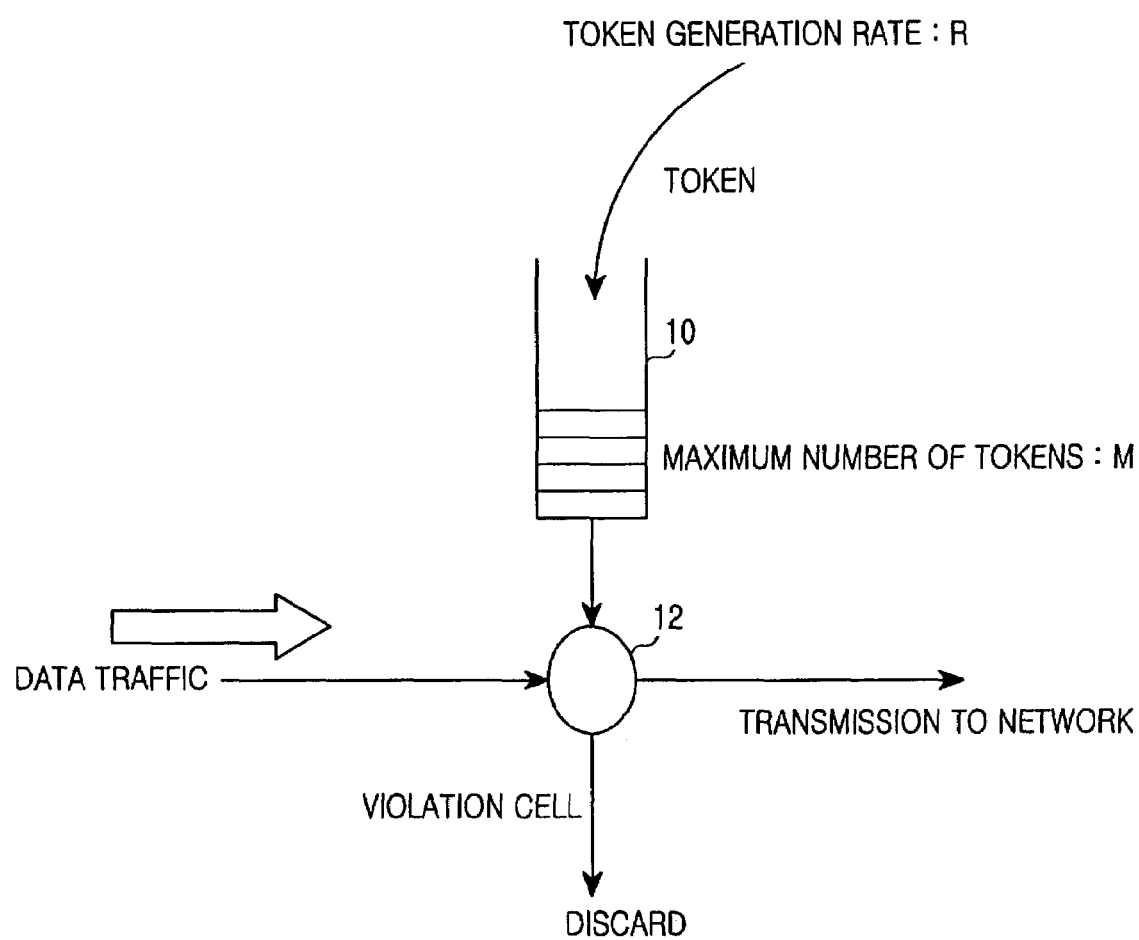
FIG. 1 is a view illustrating a leaky bucket (LB) algorithm carried out for monitoring traffic in a packet switched network.

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Typically, a packet switched network such as an asynchronous transfer mode network is a network for integrating data and multimedia traffic into one network. Since several streams of traffic having different quality of service (QoS) requirements share one source by adopting a statistical multiplexing method in the packet switched network, a predetermined network resource should be assigned to a corresponding connection whenever a connection is set up in such a way that the packet switched network satisfies a required quality of service (QoS) of the connection.

To reserve a network resource, a traffic source negotiates with a packet switched network using traffic parameters such as a maximum cell transmission rate, an average cell transmission rate, and a maximum burst length, and others. While setting up the connection, the packet switched network determines whether quality of services (QoSs) of prior connections besides the connection are satisfied using a call admission control mechanism, thereby determining a new call admission on the basis of the result. If a new connection is set up by the call admission control mechanism, then a source has to transmit traffic in conformity with the negotiated traffic parameters. However, if the source transmits much more traffic than the negotiated parameters, quality of services (QoSs) of not only the source but also of other sources may be deteriorated, and network congestion may occur.

To prevent these problems, the packet switched network monitors whether traffic transmitted from a preset connection follows the negotiated parameters by adopting a traffic monitoring mechanism. Based on the monitoring result, violation cells are discarded or are marked as low priority. In case of a connection for transmitting cells in conformity with the negotiated traffic parameters, the most ideal traffic monitoring mechanism minimizes a probability of generation of violation cells among the transmitted cells.

Efforts have been made to improve communication networks. Exemplars of recent efforts in the art include U.S. Pat. No. 5,533,020 to Byrn et al., entitled ATM CELL SCHEDULER, issued on Jul. 2, 1996, U.S. Pat. No. 5,596,576 to Milito, entitled SYSTEMS AND METHODS FOR SHARING OF RESOURCES, issued on Jan. 21, 1997, U.S. Pat. No. 6,347,077 to Ginzboorg, entitled TRAFFIC MEASUREMENT IN A COMMUNICATION SYSTEM, issued on Feb. 12, 2002, U.S. Pat. No. 6,349,088 to Ginzboorg et al., entitled TRAFFIC CONTROL IN A COMMUNICATION SYSTEM, issued on Feb. 19, 2002, and U.S. Pat. No. 5,835,711 to Chang et al., entitled METHOD AND SYSTEM FOR IMPLEMENTING MULTIPLE LEAKY BUCKET CHECKERS USING A HYBRID SYNCHRONOUS/ASYNCHRONOUS UPDATE MECHANISM, issued on Nov. 10, 1998.

Various kinds of traffic monitoring mechanisms have been proposed. Representative examples of the proposed traffic monitoring mechanism are 1) The ATM Forum, entitled "User-Network Interface (UNI) Specification Version 3.1", September 1994; 2) J. Sairmesh and N. Shroff, entitled "Limitations and Pitfalls of Leaky Bucket" and "A Study with Video Traffic" in Proc. of IEEE IC3N'94, September 1994; and 3) M. Butto, E. Cavallero, and A. Tonietti, entitled "Effectiveness of the Leakey Bucket Policing Mechanism in ATM Networks", IEEE Journal on Selected Areas in Communications, vol. 9, April 1991, pp. 335–342. A leaky bucket (LB) algorithm among the aforesaid references has the best performance, and has been implemented alone up until now. Algorithms other than the leaky bucket (LB) algorithm have not been implemented yet.

While these efforts provide advantages, they fail to adequately provide an improved method for efficiently and conveniently monitoring traffic in a packet switched network.

FIG. 1 is a view illustrating a leaky bucket (LB) algorithm carried out for monitoring traffic in a packet switched network. As shown in FIG. 1, a traffic monitoring device for performing a leaky bucket (LB) algorithm has a token buffer 10 capable of storing a maximum number M of predefined tokens. A token is generated every predetermined time interval according to a predetermined token generation rate R. A token represents a transmission opportunity. If the token buffer 10 is full of tokens, a generated token is discarded. On the contrary, if the token buffer 10 is not full of tokens yet, the generated token is stored in the token buffer 10. In the case where a data cell reaches a packet switched network, a traffic processor 12 discards one token stored in the token buffer 10 in such a way that the data cell is newly stored in the token buffer 10. In the case where there is no token in the token buffer 10 when the data cell reaches the network, the traffic processor 12 determines that the data cell violates negotiated traffic parameters, thereby discarding the data cell.

The leaky bucket (LB) algorithm is effectively operated for traffic transmitted at a fixed transmission rate in that a token is generated every predetermined time, but is not effective for another traffic carrying a large amount of data (i.e., having a bursty characteristic). Also, since the leaky bucket (LB) algorithm independently applies the traffic monitoring mechanism to each source traffic, it cannot obtain a statistical multiplexing gain considered as an advantage of a packet switched network.

To attain a statistical multiplexing gain of a packet switched network, there has been proposed a token-bank leaky bucket (TBLB) algorithm which applies a traffic monitoring mechanism to group units after combining several connections into predetermined groups. A representative example of the token-bank leaky bucket (TBLB) algorithm is described in an article "The Token-Bank Leaky Bucket Mechanisms for Group Connections in ATM Network" by S. Wu and W. E. Chen, Proc. of ICNP, pp. 226–233, 1996.

The token-bank leaky bucket (TBLB) algorithm performs a statistical multiplexing by adopting several connections as one group in such a way that connections within the group mutually share a bandwidth not used in other connections, thereby increasing bandwidth utility.

Figure 2:
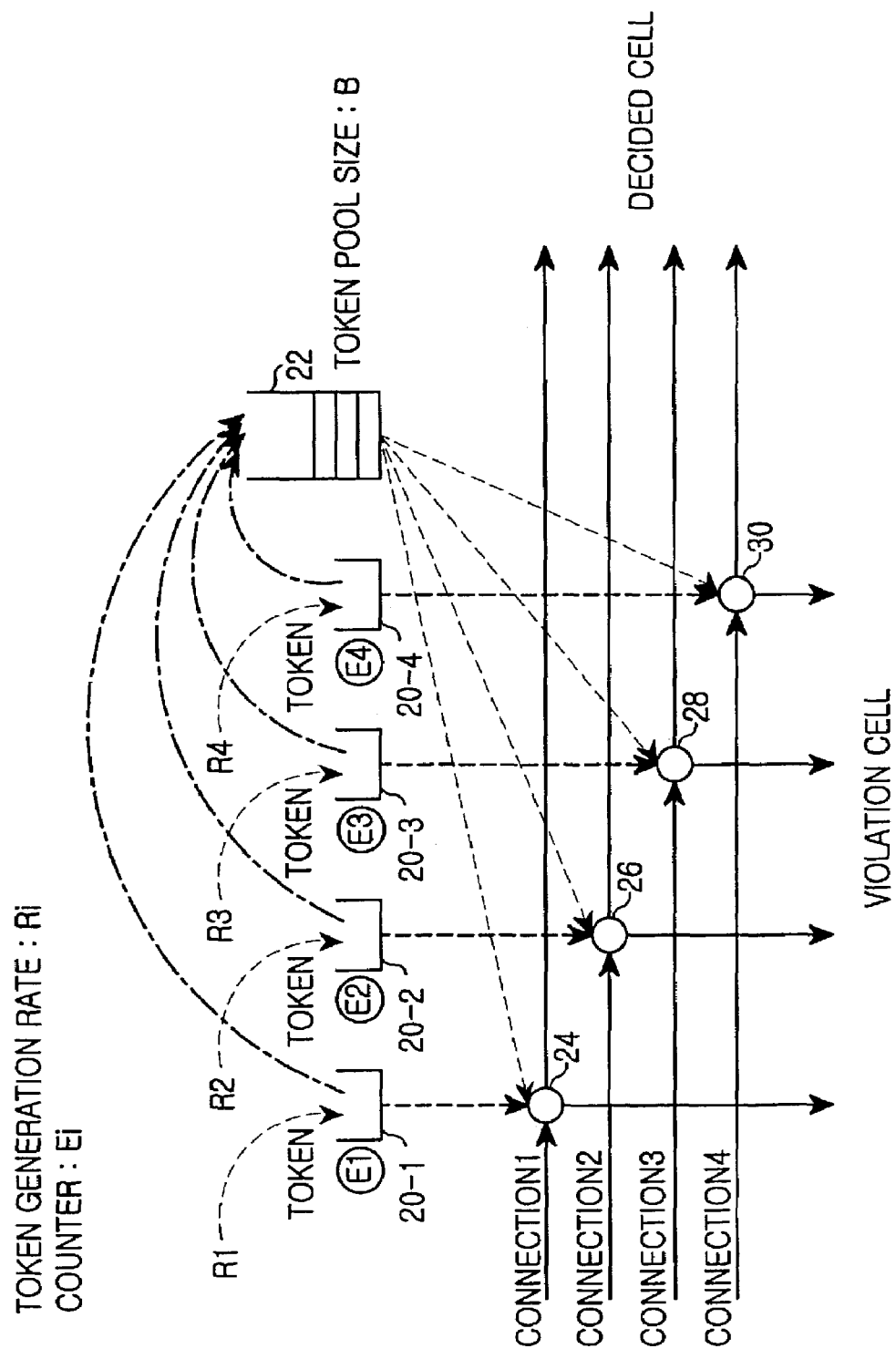
FIG. 2 is a view illustrating a token bank leaky bucket (TBLB) algorithm used for monitoring traffic in a packet switched network.

FIG. 2 is a view illustrating a token-bank leaky bucket (TBLB) algorithm used for monitoring traffic in a packet switched network. In a traffic monitoring device shown in FIG. 2, several connections are statistically multiplexed in one group, each connection within the group has one of token buffers 20-1, 20-2, 20-3, and 20-4 having a predetermined maximum size (i.e., a maximum storage number of "1") as well as a counter Ei (where, i is a connection number ranging from 1 to 4) corresponding to each token buffer. The traffic monitoring device for performing a token-bank leaky bucket (TBLB) algorithm has a shared token pool 22 shared in all connections within the group. The shared token pool 22 has a token pool size of B. Each connection generates a token with a token generation rate Ri (where, i is a connection number) of an average rate, and checks its own token buffer 20-i (where, i is a connection number) during a token generation time. In this case, if a token buffer is not over a maximum size "1", each connection stores a generated token in its own token buffer 20-i. If a token buffer is over the maximum size "1", each connection stores a generated token in the shared token pool 22 instead of discarding it. In this manner, the token-bank leaky bucket (TBLB) algorithm allows all connections within a group to share a shared token pool 22 (namely, to share a bandwidth), decreases a count value of a corresponding counter Ei by "1" whenever a token is stored in the shared token pool 22, and then counts the number of tokens stored in the shared token pool 22. In the case where the token buffer 20-i and the shared token pool 22 are over a predetermined maximum size, a generated token is discarded.

If a data cell reaches one of connections, then a packet processor 24, 26, 28 or 30 of a corresponding connection checks its own token buffer 20-i. Herein, if there is a token in the checked token buffer 20-i, a packet processor 24, 26, 28 or 30 transmits the data cell using a token of the token buffer 20-i. If there is no token in the checked token buffer 20-i, a packet processor 24, 26, 28 or 30 determines whether there is a token in a shared token pool 22.

In the case where there is a token in the shared token pool 22, the packet processor 24, 26, 28 or 30 retrieves a token from the shared token pool 22, and transmits the data cell. Then, the packet processor increases a count value of a corresponding counter Ei by "1" in such a way that it counts the number of tokens retrieved from the shared token pool 22.

A priority Pi of each connection is defined as a value of Ei/Ri. A higher priority is assigned to a connection in order of descending Pi values. In the case where several connections attempt to retrieve a token from a shared token pool 22, a connection having a high priority successfully retrieves the token from the shared token pool 22.

Since a high priority is assigned to a connection for storing many tokens in the shared token pool 22, a bandwidth is fairly assigned to the connections. Also, the token-bank leaky bucket (TBLB) algorithm assigns a predetermined credit limit for every connection. As a result, in the case where a certain connection transmits much more data than a contracted (i.e., negotiated) token generation rate, the token-bank leaky bucket (TBLB) algorithm prevents the connection from occupying a wider bandwidth than a connection following the contracted token generation rate.

In brief, a traffic monitoring device for a token-bank leaky bucket (TBLB) mechanism includes a token buffer 20-i having a predetermined size "1" and a counter Ei in each connection within a group, and one shared token pool 22 for an overall group.

A token is generated with a predetermined period in accordance with a token generation mechanism for a corresponding connection in every connection. A generated token is stored in a token buffer 20-i when a corresponding token buffer 20-i is empty. If a corresponding token buffer 20-i is not empty, a generated token is stored in a shared token pool 22 under the condition that the shared token pool 22 is not fully filled with tokens. If a data cell reaches a connection having an empty token buffer 20-i, the connection borrows one token from the shared token pool 22, and then transmits the data cell using the borrowed token. That is, connections within a group obtain a statistical multiplexing gain using the shared token pool 22.

However, in accordance with the aforesaid token-bank leaky bucket (TBLB) algorithm, in the case where a source transmits much more traffic than contracted traffic parameters, the number of tokens borrowed from a shared token pool 22 increases, resulting in a degradation of a quality of service (QoS) of a well-operated connection. Increasing the number of the borrowed tokens has the same effect as using an assigned resource in the well-operated connection following the contracted parameters, thereby deteriorating the quality of service (QoS) of the well-operated connection. In other words, the token-bank leaky bucket (TBLB) algorithm has a fairness problem in that a particular connection that is violating the contracted/negotiated traffic parameters can use more of a network resource than other connection that are following the contracted/negotiated traffic parameters. When a connection violates the contracted/negotiated traffic parameters, that connection can be said to be violating the contract. When a connection adheres to the contracted/negotiated traffic parameters, that connection can be said to be a contract-following connection. Although the token-bank leaky bucket (TBLB) algorithm predetermines the number of tokens to be borrowed from a shared token pool in order to attempt to prevent the fairness problem, it cannot ensure fair use of the network resource for all connections.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

The present invention newly proposes a fairness improvement leaky bucket (FILB) algorithm. The fairness improvement leaky bucket (FILB) algorithm prevents each connection of a group from violating the contract, because the fairness improvement leaky bucket (FILB) algorithm prevents each connection of a group from using more of a network resource than contracted traffic parameters. Also, the fairness improvement leaky bucket (FILB) algorithm obtains a statistical multiplexing gain of a token bank leaky bucket (TBLB) algorithm. Therefore, in view of the foregoing, the fairness improvement leaky bucket (FILB) algorithm enables all connections connected to a network to fairly use the network resource. In accordance with the fairness improvement leaky bucket (FILB) algorithm according to the present invention, each connection has a cell buffer for storing a data cell. A traffic monitoring device determines whether a connection follows contracted traffic parameters.

In the case where the connection regards a certain data cell as a violation data cell due to a temporary deficiency of the network resource although it follows the contracted traffic parameters, the violation data cell is stored in a cell buffer. The present invention protects the data cell received from such connection following the contracted traffic parameters in such a way that the network resource can be fairly used for all connections.

Figure 3:
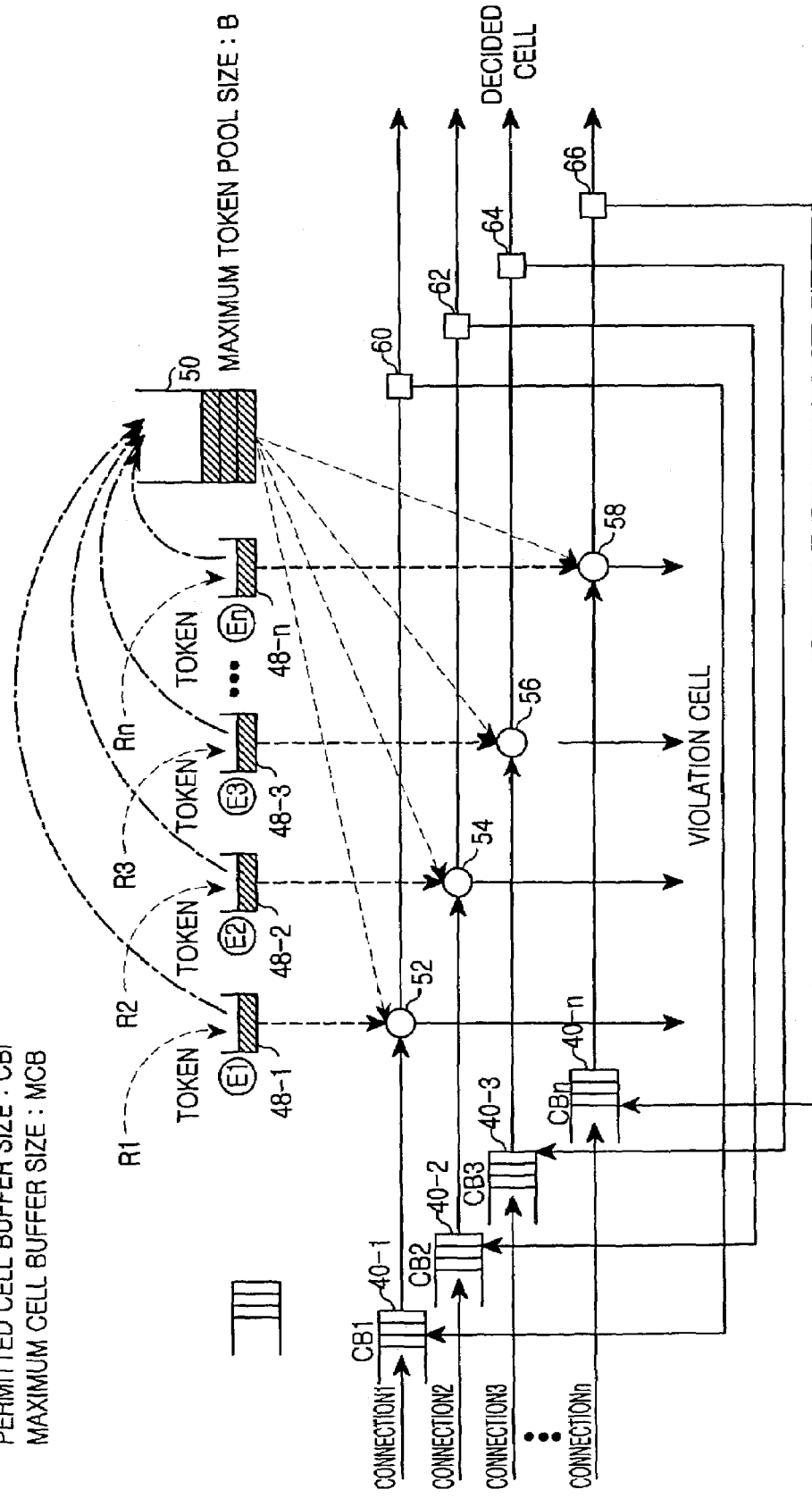
FIG. 3 is a view illustrating a traffic monitoring device for explaining a fairness improvement leaky bucket (FILB) algorithm, in accordance with the principles of the present invention.

FIG. 3 is a view illustrating a fairness improvement leaky bucket (FILB) algorithm, in accordance with the principles of the present invention. Referring to FIG. 3, n connections are grouped in one group in a traffic monitoring device. Each connection in the group includes a token buffer 48-i (where, i is a connection number ranging from 1 to n) having a predetermined maximum size (i.e., a maximum storage number of "1"), a counter Ei (where, i is a connection number ranging from 1 to n) having an initial value of "0", and a cell buffer 40-i (where, i is a connection number ranging from 1 to n) having a maximum size of "MCB" (Maximum Cell Buffer size). The cell buffer 40-i is used for storing a data cell of a connection following contracted traffic parameters in case of a temporary deficiency of a network resource. The cell buffer 40-i stores data cells by a permitted cell buffer size CBi containing allowable data cells to be stored therein. The permitted cell buffer size CBi has an initial value "0", and is controlled by a corresponding cell buffer size controller 60, 62, 64 or 66.

In addition, the traffic monitoring device shown in FIG. 3 includes a shared token pool 50 shared among all connections of a group. The shared token pool 50 has a maximum token pool size "B". Each maximum size of the token buffer 48-1, 48-2, 48-3 or 48-4 may be over "1". In the traffic monitoring device (also called a packet monitoring device) shown in FIG. 3, a reference number 52, 54, 56 or 58 is a packet processor of each connection, and another reference number 60, 62, 64 or 66 is a cell buffer controller. The packet processor 52, 54, 56, or 58 transmits the received data cell to a destination network using a token. The cell buffer size controller 60, 62, 64 or 66 controls a permitted cell buffer size CBi of a corresponding cell buffer 40-i according to a count value of a counter Ei (where, i is a connection number ranging from 1 to n) of a connection i.

Figure 4:
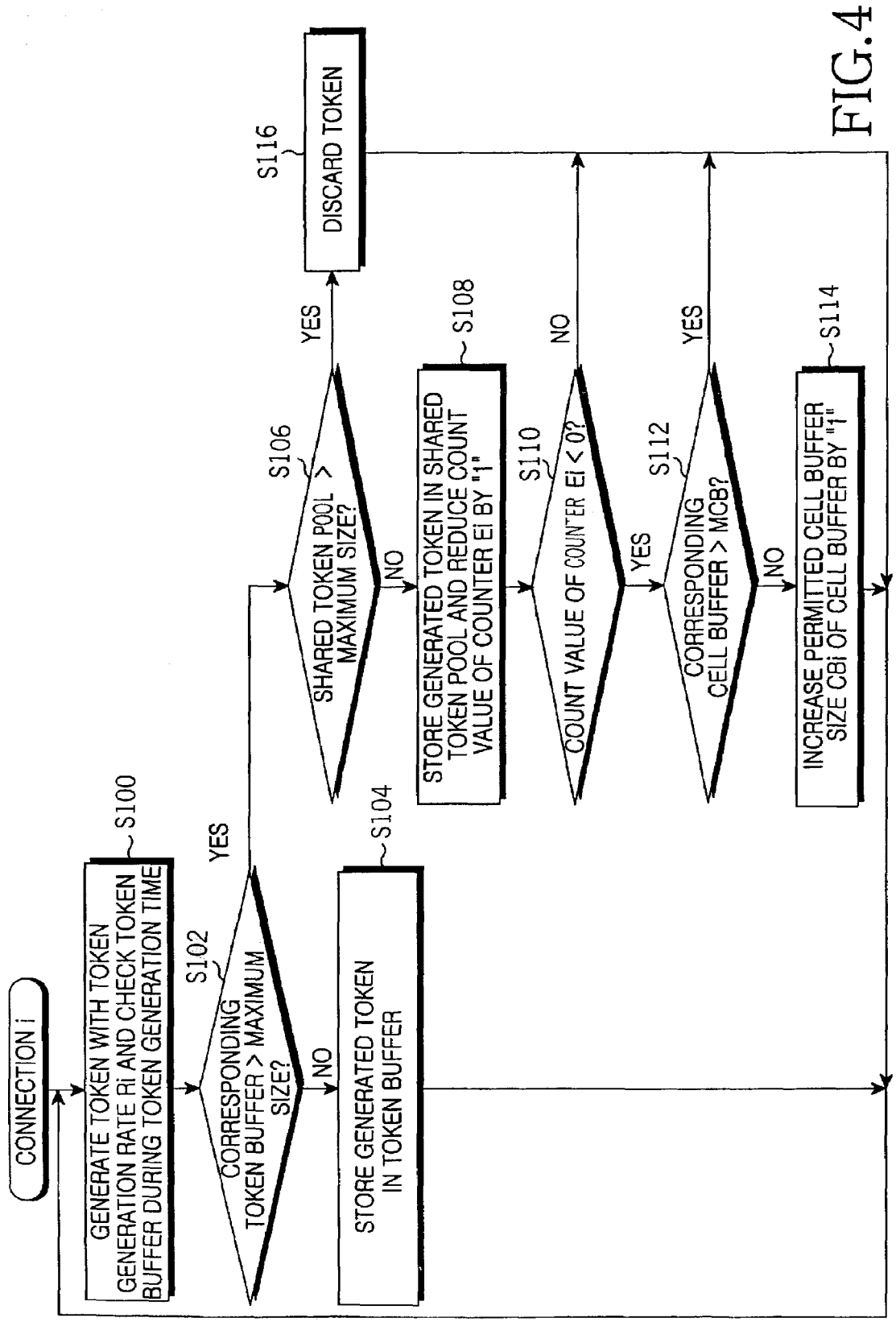
FIG. 4 is a flow chart illustrating a token processing procedure for generating each connection at a token generation rate Ri, in accordance with the principles of the present invention.

FIG. 4 is a flow chart illustrating a token processing procedure by which each connection is generated at a token generation rate, in accordance with the principles of the present invention. A token processing method for generating each connection at a token generation rate Ri, in accordance with the principles of the present invention, will hereinafter be described with reference to FIGS. 3 and 4.

At step S100, referring to FIGS. 3 and 4, according to a packet monitoring device of a packet switched network shown in FIG. 3, each connection of a group generates a token at an average token generation rate Ri (where, i is a connection number), and checks its own token buffer 48-i (where, i is a connection number) during a token generation time. At step S102, a corresponding connection determines whether a token buffer 48-i is over a predetermined maximum size (e.g., "1"). At step S104, if the token buffer 48-i is less than the predetermined maximum size at step S102, a generated token is stored in a token buffer 48-i for the corresponding connection. At step S106, if the token buffer 48-i is over the predetermined maximum size (e.g., "1") at step S102, the connection firstly checks a status of a shared token pool 50 without discarding a redundant token among the generated tokens. In other words, at step S106, a corresponding connection i determines whether the shared token pool 50 is over a maximum size "B". At step S108, if the shared token pool 50 is less than the maximum size "B", the connection stores its own generated token in the shared token pool 50. In this manner, the present invention using a fairness improvement leaky bucket (FILB) algorithm enables all connections within a group to share a shared token pool 50, that is, to share a bandwidth. Furthermore, at step S108, whenever a corresponding connection stores a token in the shared token pool 50, the connection i decreases a count value of a corresponding counter Ei by "1", thereby counting the number of tokens stored in the shared token pool 50.

At step S110, the connection i determines whether a count value of its own counter Ei is less than "0". At step S112, the connection i determines whether a permitted cell buffer size CBi of a corresponding cell buffer 40-i is over a predetermined maximum size "MCB". At step S114, in the case where the count value of the counter Ei is less than "0" (i.e., a negative number) at step S110 and the permitted cell buffer size CBi of the corresponding cell buffer 40-i (i.e., one of 40-1, 40-2, 40-3 and 40-4) is less than the predetermined maximum size "MCB" at step 112, the connection i increases a permitted cell buffer size CBi of its own cell buffer 40-i by "1" by adopting a corresponding cell buffer size controller 60, 62, 64 or 66. It is desirable that the predetermined maximum size "MCB" of the cell buffer 40-i is determined to be equal to or slightly over a maximum burst size of the connection i. Also, the case where the count value of the counter Ei is a negative number at step S110 indicates that the number of tokens stored in a shared token pool 50 by the connection i is more than the number of tokens retrieved from the shared token pool 50.

At step S116, in the case where a token buffer 48-i and a shared token pool 50 respectively are over a predetermined maximum size during a token generation time at steps S102 and S106, a corresponding connection i discards its own generated token. The discarding of the generated token is carried out by a corresponding packet processor 52, 54, 56 or 58.

Figure 5:
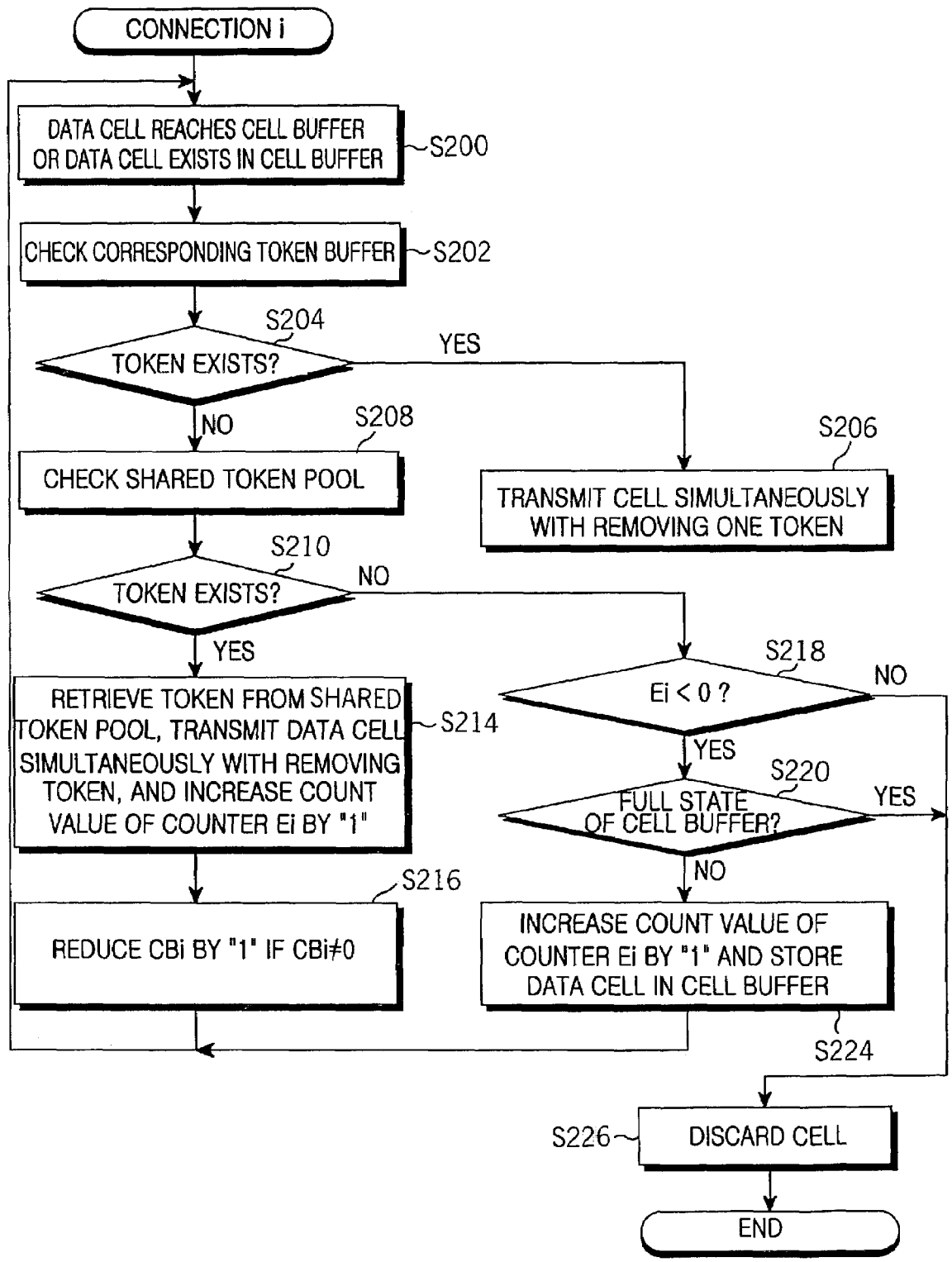
FIG. 5 is a flow chart illustrating a traffic monitoring procedure of each connection, in accordance with the principles of the present invention.

FIG. 5 is a flow chart illustrating a traffic monitoring procedure of each connection, in accordance with the principles of the present invention. A method for monitoring traffic positioned in a cell buffer 40-i or operations carried out when a data cell reaches each connection will hereinafter be described with reference to FIGS. 3 and 5.

At step S200, referring to FIGS. 3 and 5, data cell reaches a connection i or there is a data cell in a cell buffer 40-i. At step S202, a corresponding connection i checks its own token buffer 48-i. At step S204, the connection i determines whether there is a token in a token buffer 48-i. At step S206, If there is a token in the token buffer 48-i at step S204, then the connection i transmits the data cell simultaneously with removing one token from its own token buffer 48-i. At step S208, if the token buffer 48-i is empty at step S204, then the connection i checks a shared token pool 50. At step S214, if there is a token in the shared token pool 50 at step S210, the connection i retrieves a token from the shared token pool 50, transmits a data cell and removes the retrieved token, and increases a count value of its own counter Ei by "1", thereby counting the number of tokens retrieved from the shared token pool 50. At step S214, the transmission of the data cell and the removing of the retrieved token occurs substantially simultaneously. Transmitting the data cell is carried out by a packet processor 52, 54, 56 or 58.

Herein, the case where the count value of the counter Ei is a negative number after increasing the count value of the counter Ei by "1" upon retrieving a token from the shared token pool 50 indicates that a redundant token previously stored in the shared token pool 50 by the connection i is used. On the contrary, the case where the count value of the counter Ei is a positive number indicates that the connection i borrows a token stored in the shared token pool 50 by other connections of a group from the other connections. In other words, the case where the counter value of the counter Ei is a positive number indicates that a redundant bandwidth not used by other connections of a group is shared.

At step S216, if the connection i retrieves a token from a shared token pool 50 as in step S214, the connection i decreases a corresponding permitted cell buffer size CBi by "1" if the permitted cell buffer size CBi is not "0". The permitted cell buffer size CBi is controlled by a cell buffer size controller 60, 62, 64 or 66.

Since a data cell transmission is carried out according to a synchronous method in an asynchronous transfer mode (ATM) network, many connections may attempt to simultaneously use tokens stored in a shared token pool 50 to transmit their own data cells. To prepare for this case, the principles of the present invention define a priority Pi of each connection as Ei/Ri. And, in accordance with the principles of the present invention, the invention calculates a priority Pi of each connection in such a way that a connection having the lowest Pi can firstly use a token of the shared token pool 50. In more detail, if many connections attempt to retrieve a token from the shared token pool 50, a connection having the lowest Pi retrieves a token from the shared token pool 50. Since a high priority is assigned to a connection storing many tokens in the shared token pool 22, a bandwidth is fairly (i.e., uniformly) assigned to connections.

Steps S218 and S220 are performed in the case where a data cell reaching a connection i or a data cell present in a cell buffer 40-i does not acquire a token from a shared token pool 50. At step S218, the connection i checks a count value of a corresponding counter Ei. At step S220, the connection i checks a status of a cell buffer 40-i. If the count value of the counter Ei is less than "0" at step S218 and the cell buffer 40-i is not full at step S220, that is, if the number of data cells stored in a cell buffer 40-i is less than a maximum number "MCB", then a connection i goes to step S224. At step S224, the connection i stores the data cells in its own cell buffer 40-i. As a result, the data cells stored in the cell buffers 40, 42, 44, and 46 are able to acquire a token in the future and transmit it.

Operations shown in steps S218–S224 are the inventive features of the present invention. They enable a contract-following connection to maintain a constant service rate regardless of a transmission rate of traffic received from a contract-violating connection, because the present invention stores a data cell in a cell buffer even when the connection regards the data cell as a violation data cell due to a temporary deficiency of the network resource, although the data cell follows the contracted traffic parameters.

However, if the count value of the counter Ei is greater than or equal to "0" (i.e., Ei>0) at step S218 or the cell buffer 40-i is full at step S220, a connection i goes to step S226. At step S226, the connection i discards the data cells stored in the cell buffer 40-i.

A performance of the fairness improvement leaky bucket (FILB) algorithm, in accordance with the principles of the present invention, is tested by a predetermined simulation, and is compared with those of typical algorithms. The following simulation result shows that the inventive fairness improvement leaky bucket (FILB) algorithm having a good performance enables connections of a group to fairly (i.e., uniformly) use a network resource.

Simulation Result

Herein below, in accordance with the principles of the present invention, a performance of the fairness improvement leaky bucket (FILB) algorithm will be tested using a simulation with the same source traffic as a predetermined reference to compare the performance of the fairness improvement leaky bucket (FILB) algorithm with a performance of the token bank leaky bucket (TBLB) algorithm. Herein, the predetermined reference is an article "The Token-Bank Leaky Bucket Mechanisms for Group Connections in ATM Network" by S. Wu and W. E. Chen, Proc. of ICNP, pp. 226–233, 1996.

In this simulation, a discrete time IPP (Interrupted Poisson Process) is considered as source traffic. In the IPP, a status is changed from ON state to OFF state for every slot, and a probability of such status conversion is set to "1−α". A source at the ON status transmits a data cell for every slot. On the contrary, another source at the OFF status does not transmit a data cell for every slot. For more understanding, in this simulation, α=0.9975 and β=0.99875. Using these parameters α and β, an average cell transmission rate of each connection is to be ⅓=0.333.

A traffic monitoring mechanism according to the present invention protects a first source following contracted traffic parameters from a second source transmitting a data cell upon violating the contracted traffic parameters, and thereby allows the first source to use a network resource assigned to the first source. Also, it should be noted that the traffic monitoring mechanism minimizes a probability of generation of violation data cells among the data cells transmitted from a source following the contracted traffic parameters. Therefore, to measure a performance of the traffic monitoring mechanism, a VP (Violation Probability) defined in the predetermined reference article proposed by S. Wu and W. E. Chen and a network SR (Service Rate) of each source are used as performance measurement parameters.

Figure 6:
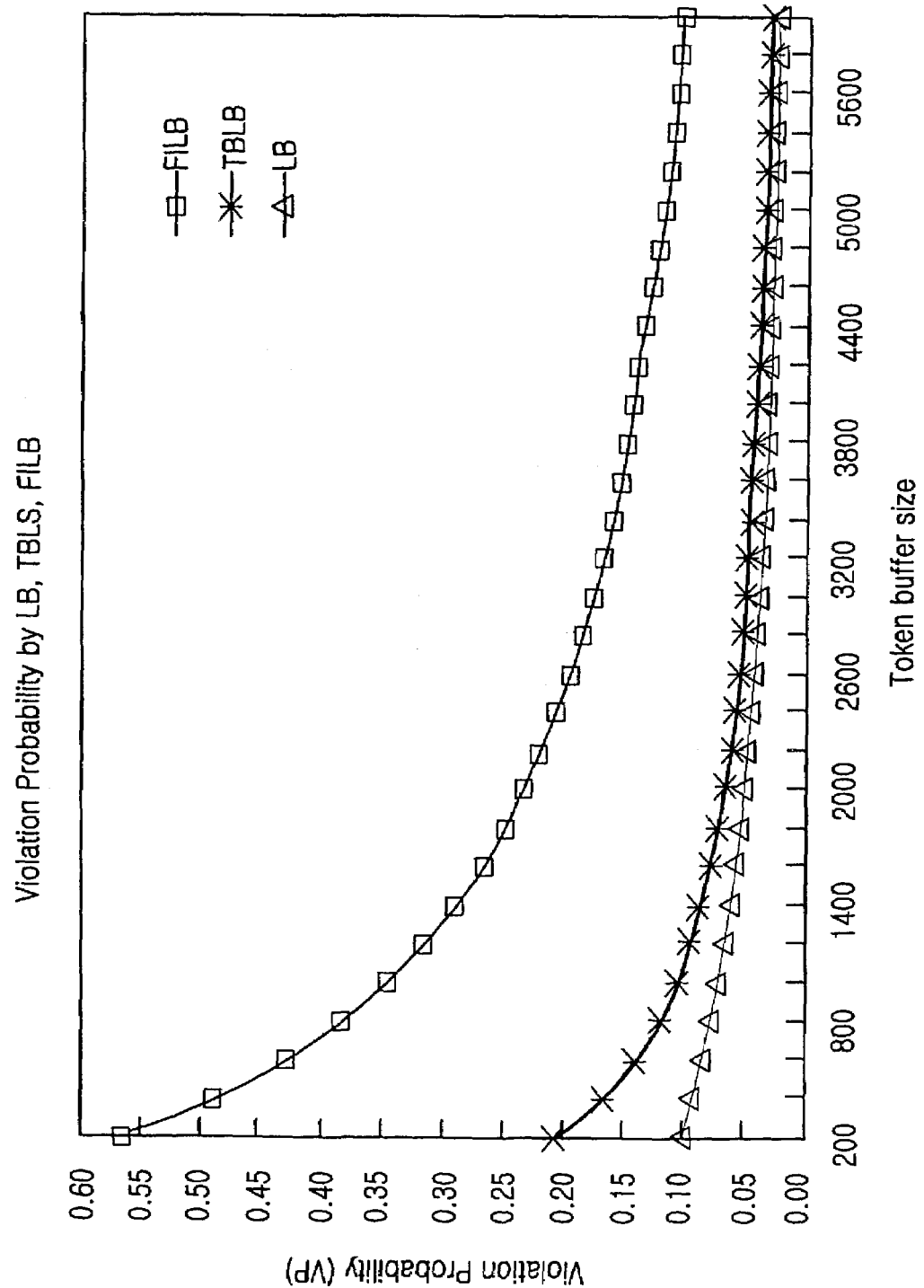
FIG. 6 is a graph illustrating cell violation probabilities of an leaky bucket (LB) algorithm, a token bank leaky bucket (TBLB) algorithm, and a fairness improvement leaky bucket (FILB) algorithm with respect to a token buffer size, in accordance with the principles of the present invention.

FIG. 6 is a graph illustrating cell violation probabilities of an leaky bucket (LB) algorithm, a token bank leaky bucket (TBLB) algorithm, and a fairness improvement leaky bucket (FILB) algorithm having a cell buffer size 400 with respect to a token buffer size in case of four connections present in one group, in accordance with the principles of the present invention. As shown in FIG. 6, the fairness improvement leaky bucket (FILB) algorithm according to the present invention shows a better performance than the leaky bucket (LB) algorithm. Also, the fairness improvement leaky bucket (FILB) algorithm has a better performance than the token bank leaky bucket (TBLB) algorithm because it uses more cell buffers than the token bank leaky bucket (TBLB) algorithm, not owing to characteristics of the algorithm. Therefore, a data cell regarded as a violation data cell in the token bank leaky bucket (TBLB) algorithm is stored in a cell buffer of the fairness improvement leaky bucket (FILB) algorithm so that the fairness improvement leaky bucket (FILB) algorithm can enhance its own performance by the number of data cells additionally stored in the cell buffer. Therefore, if there is no cell buffer in the fairness improvement leaky bucket (FILB) algorithm, it is hard to say that the fairness improvement leaky bucket (FILB) algorithm has a superior performance than the token bank leaky bucket (TBLB) algorithm.

However, according to the token bank leaky bucket (TBLB) algorithm, if at least one source transmits many more data cells than contracted traffic parameters, a performance of other sources may be degraded due to such transmission. Therefore, according to the token bank leaky bucket (TBLB) algorithm, a performance change caused by a connection transmitting many data cells in violation of the contracted traffic parameters should be observed.

Figure 7:
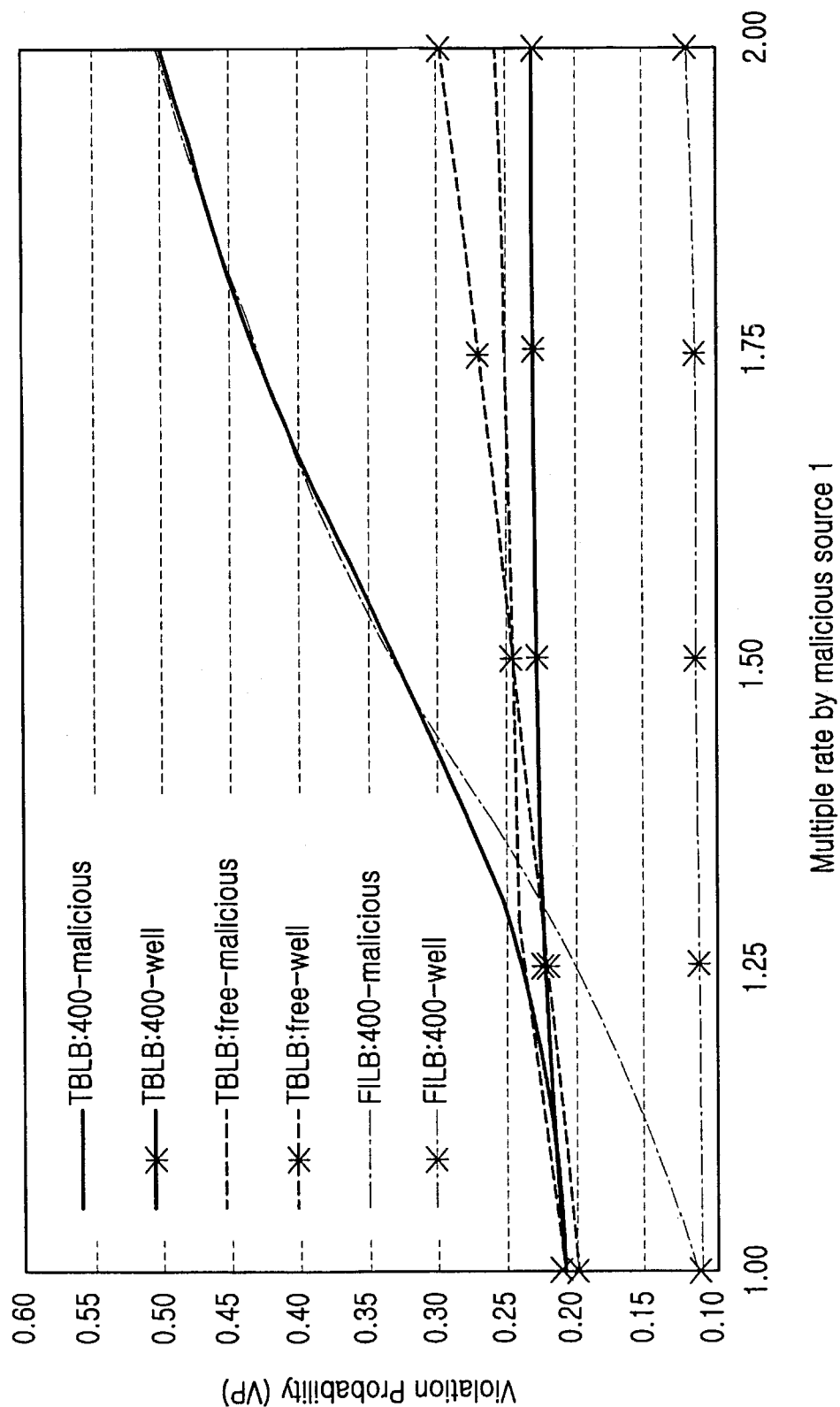
FIG. 7 is a graph illustrating a cell violation probability of each connection with respect to a contract violation source, in accordance with the principles of the present invention.

FIG. 7 is a graph illustrating a violation probability of each connection in the token bank leaky bucket (TBLB) algorithm and the inventive fairness improvement leaky bucket (FILB) algorithm in the case one of four connections consisting of one group transmits data cells at a rate higher than a contracted rate.

Figure 8:
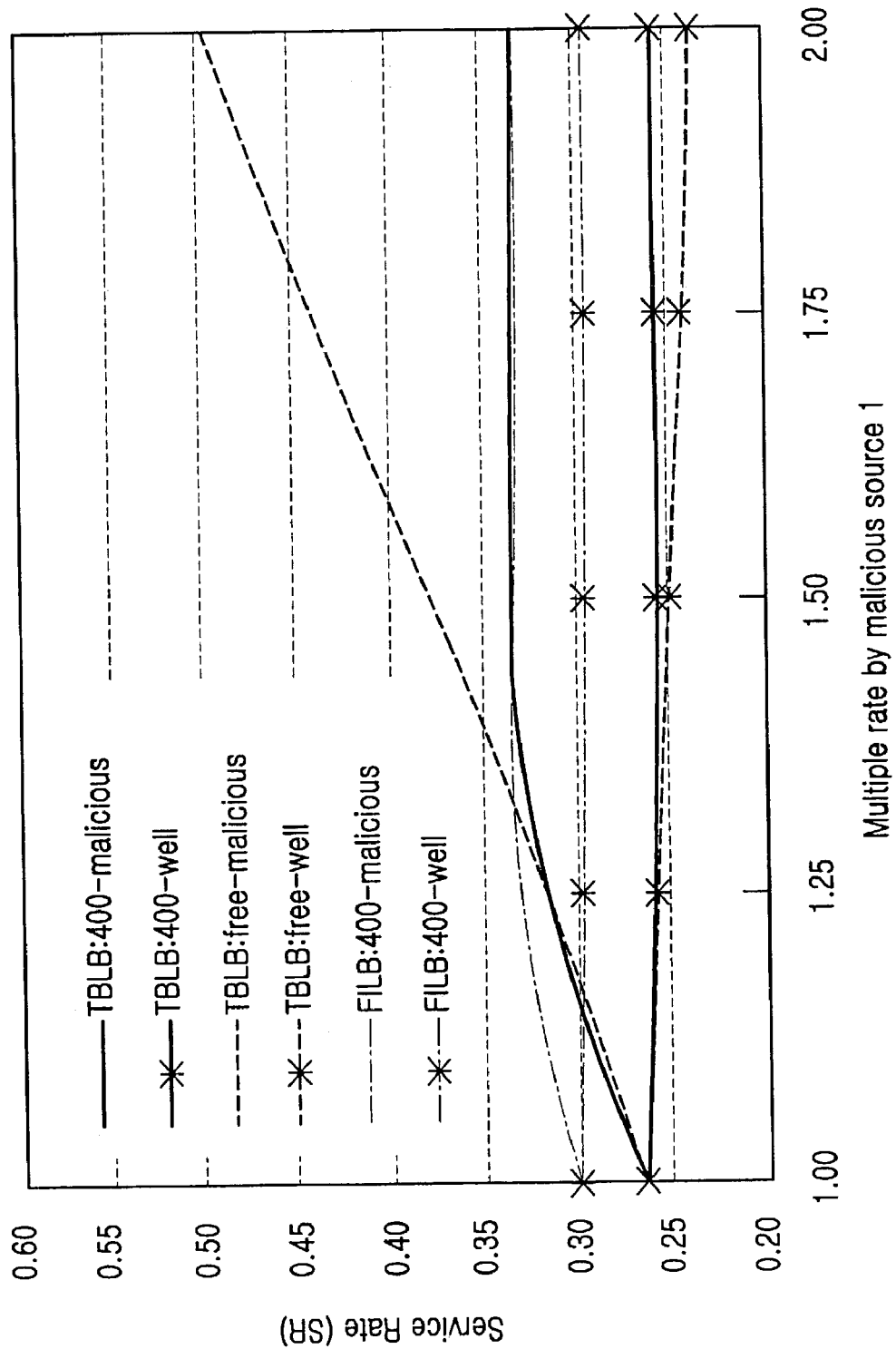
FIG. 8 is a graph illustrating a service rate of each connection with respect to a contract violation source, in accordance with the principles of the present invention.

FIG. 8 is a graph illustrating a service rate of each connection in association with FIG. 7. In case of the token bank leaky bucket (TBLB) algorithm, a credit limit (CR) is predetermined to prevent a contract-violation connection from overusing a network resource. FIGS. 7 and 8 explain a token bank leaky bucket (TBLB) algorithm having a CR value of 400 and another token bank leaky bucket (TBLB) algorithm having infinite CR value.

In accordance with the token bank leaky bucket (TBLB) algorithm having no CR value as shown in FIG. 7, in the case where one connection transmits a data cell in violation of contracted traffic parameters, violation probabilities of other connections following the contracted traffic parameters increase due to such violation connection.

Even if a CR is set to "400" to protect a connection following contracted traffic parameters from a violation connection transmitting data cells in violation of contracted traffic parameters, a violation probability of the violation connection considerably increases. But, the higher the amount of data cells transmitted from the violation connection, the higher the violation probability of the connection following contracted traffic parameters.

On the other hand, in case of the fairness improvement leaky bucket (FILB), in accordance with the principles of the present invention, the higher an average transmission rate transmitted from a violation connection, the higher a violation probability. The violation probability of a connection (i.e., called a contract-following connection) transmitting data cells in conformity with the contracted traffic parameters is almost constant, regardless of the increase of a cell transmission rate. The advantage of the inventive fairness improvement leaky bucket (FILB) algorithm in contrast with the token bank leaky bucket (TBLB) algorithm is shown in FIG. 8 in detail. As shown in FIG. 8, in case of the token bank leaky bucket (TBLB) algorithm, the higher the transmission rate of a violation connection, the higher the service rate (SR) of the violation connection. In other words, the service rate used in a violation connection is higher than an average service rate predetermined in a call admission control procedure, but a service rate used in a contract-following connection becomes lowered. The reason is that the higher the average transmission rate of the violation connection, the greater the amount of network resource assigned to the contract-following connection.

On the other hand, in case of the inventive fairness improvement leaky bucket (FILB) algorithm, a service rate of a contract-following connection is constantly maintained, irrespective of a transmission rate of traffic transmitted from a violation connection. In more detail, in the case where a network resource is temporarily insufficient, data cells transmitted from the contract-following connection are stored in a cell buffer, and then the data cells stored in a cell buffer assigned to such connection can firstly use tokens stored in a shared token pool. As a result, a service rate of the contract-following connection can be constantly maintained. So, in the fairness improvement leaky bucket (FILB) algorithm according to the present invention, a connection permitted by a call admission control algorithm can fairly (i.e., uniformly) use its own assigned network resource, and is little affected by a violation connection.

In accordance with another embodiment of the present invention, the fairness improvement leaky bucket (FILB) algorithm can be applicable to a general packet network as well as an asynchronous transfer mode (ATM) network. In this case, a data cell will be denoted as a packet, and a cell buffer 40-i will be denoted as a data buffer. In another embodiment, the present invention can be used to improve other types of communication networks.

The detailed description for another embodiment of the present invention will hereinafter be described below. Each token buffer assigned to each connection has a single packet, for example, a maximum size (i.e., called a maximum packet size) of an IP (Internet Protocol) packet. Such token buffer 48-i generates a token at an average data transmission rate of the contracted traffic parameters while setting up a connection. In this case, a generated token is stored in a token buffer 48-i of the connection if the token buffer 48-i is not full of tokens. If the token buffer 48-i is full of tokens, the generated token is stored in a shared token pool 50. Whenever the token is stored in the shared token pool 50, the connection reduces a count value of its own counter Ei by "1".

If a packet reaches a single connection, it determines whether sufficient tokens are present in a token buffer 48-i assigned to the packet. If sufficient tokens as many as a packet size are present in the token buffer 48-i, the connection transmits the packet while substantially simultaneously removing as many tokens as the packet size. If sufficient tokens are not present in the token buffer 48-i, the packet determines whether necessary tokens are present in the shared token pool 50. If there are necessary tokens in the shared token pool 50, a count value of a counter Ei for a corresponding connection increases by the number of tokens borrowed from the shared token pool 50, and the connection transmits a packet and removes the number of borrowed tokens of the shared token pool 50 substantially simultaneously. That is, if Ei<0, it means that the number of tokens lent to the shared token pool 50 is more than the number of other tokens not lent to the shared token pool 50 in the number of all generated tokens. On the contrary, if Ei>0, it means that a connection i uses more network resources than contracted network resources. In more detail, if Ei>0, it means that the connection i fully uses contents (i.e., tokens) stored in its own token buffer 48-i, and uses many tokens more than tokens stored in the shared token pool 50. After a packet reaches a single connection, if the number of tokens usable by both a token buffer 48-i of a connection i and a shared token pool 50 is less than a packet size, a packet monitoring device checks a counter Ei of the connection i. Herein, if Ei<0, the packet monitoring device determines that a temporary deficiency of a network resource occurs even though it follows contracted parameters, and thus stores a received packet in a data buffer (also called a cell buffer 40-i in an asynchronous transfer mode (ATM) network). On the contrary, if Ei>0, the packet monitoring device determines that a connection i transmits much more data than contracted, in violation of a contract even though there is usable space in a data buffer, and then determines a received packet as a violation packet.

In this manner, the fairness improvement leaky bucket (FILB) algorithm can be applicable to a general packet network other than an asynchronous transfer mode (ATM) network.

As apparent from the above description, the present invention obtains a statistical multiplexing gain being an advantage of a packet switched network by adopting a fairness improvement leaky bucket (FILB) algorithm as a traffic monitoring mechanism in a packet switched network such as an asynchronous transfer mode (ATM) or Internet protocol (IP) network. Also, the present invention prevents a connection transmitting many more data cells than contracted traffic parameters from overusing an assigned network resource in such a way that a contract-following connection can fairly use a network resource.

In accordance with the principles of the present invention, there is provided a method for monitoring traffic in a packet switched network, the method comprising: providing a plurality of connections for a packet switched network, the connections being grouped into a single group, the connections including at least a first connection; providing a plurality of token buffers, each one of the token buffers corresponding to a respective one of the connections, the token buffers including at least a first token buffer storing tokens generated at a predetermined rate by the connection corresponding to the first token buffer, the first token buffer corresponding to the first connection, the first token buffer having a first predetermined maximum size; providing a token pool shared by the connections, the token pool storing tokens generated by the first connection when the first token buffer is filled to the first predetermined maximum size, the token pool having a second predetermined maximum size; providing a plurality of counters, each one of the counters corresponding to a respective one of the connections, the counters including at least a first counter, the first counter corresponding to the first connection and counting tokens stored in the token pool by the first connection; and providing a plurality of data buffers, each one of the data buffers corresponding to a respective one of the connections, the data buffers including at least a first data buffer, the first data buffer corresponding to the first connection, the first data buffer storing a packet of the first connection when a network resource is deficient and the first connection is a contract-following connection.

The network resource can be considered to be deficient when that network resource does not conform to predetermined criteria. The predetermined criteria could include such factors as "must respond to query within X seconds" where X is a number. Therefore, if the network resource fails to respond to a query within X seconds, then the network resource is deemed to have not conformed to the predetermined criteria.

A connection is considered to be a contract-following connection when that connection adheres to the negotiated traffic parameters or contracted traffic parameters. A connection conforms to predetermined traffic parameters when that connection adheres to negotiated traffic parameters or contracted traffic parameters. A traffic unit can be a packet or data cell or other type of data unit.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method for monitoring traffic in a packet switched network, the method comprising:
   providing a plurality of connections for a packet switched network, the connections being grouped into a single group, the connections including at least a first connection;
   providing a plurality of token buffers, each one of the token buffers corresponding to a respective one of the connections, the token buffers including at least a first token buffer storing tokens generated at a predetermined rate by the connection corresponding to the first token buffer, the first token buffer corresponding to the first connection, the first token buffer having a first predetermined maximum size;

providing a token pool shared by the connections, the token pool storing tokens generated by the first connection when the first token buffer is filled to the first predetermined maximum size, the token pool having a second predetermined maximum size;

providing a plurality of counters, each one of the counters corresponding to a respective one of the connections, the counters including at least a first counter, the first counter corresponding to the first connection and counting tokens stored in the token pool by the first connection;

providing a plurality of data buffers, each one of the data buffers corresponding to a respective one of the connections, the data buffers including at least a first data buffer, the first data buffer corresponding to the first connection, the first data buffer storing a packet of the first connection when a network resource is deficient and the first connection is a contract-following connection;

when the first token buffer is filled to the first predetermined maximum size and the token pool is not filled to the second predetermined maximum size, storing tokens generated during a token generation time in the token pool and controlling a count value of the first counter, said controlling of the count value being in dependence upon said storing of the tokens generated during the token generation time;

detecting the count value of the first counter;

selectively controlling a maximum size of the first data buffer in dependence upon the detected count value of the first counter;

when a first received packet reaches the first data buffer, checking the first token buffer;

when the first received packet reaches the first data buffer and the first token buffer does not contain any tokens, checking the token pool; and when the first received packet reaches the first data buffer and the first token buffer does not contain any tokens and the token pool does not contain any tokens, selectively storing the first received packet in the first data buffer in dependence upon the count value of the first counter.

2. The method of claim 1, further comprising:

when a second received packet is stored in the first data buffer, checking the first token buffer;

when the second received packet is stored in the first data buffer and the first token buffer does not contain any tokens, checking the token pool; and when the second received packet is stored in the first data buffer and the first token buffer does not contain any tokens and the token pool does not contain any tokens, selectively storing the second received packet in the first data buffer in dependence upon the count value of the first counter.

3. A method for monitoring traffic in a communication network, the method comprising:

generating tokens by a plurality of connections for a communication network, the connections being grouped into a single group, the connections including at least a first connection;

providing a plurality of token buffers, each one of the token buffers corresponding to a respective one of the connections, the token buffers including at least a first token buffer storing tokens generated at a predetermined rate by the connection corresponding to the first token buffer, the first token buffer corresponding to the first connection, the first token buffer having a first predetermined maximum size;

providing a token pool shared by the connections, the token pool storing tokens generated by the first connection when the first token buffer is filled to the first predetermined maximum size, the token pool having a second predetermined maximum size;

providing a plurality of counters, each one of the counters corresponding to a respective one of the connections, the counters including at least a first counter, the first counter corresponding to the first connection and counting tokens stored in the token pool by the first connection;

providing a plurality of data buffers, each one of the data buffers corresponding to a respective one of the connections, the data buffers including at least a first data buffer, the first data buffer corresponding to the first connection, the first data buffer storing a packet of the first connection when a network resource is deficient and the first connection is a contract-following connection, the first data buffer having a current size and a maximum size;

when the first token buffer is filled to the first predetermined maximum size and the token pool is not filled to the second predetermined maximum size, storing tokens generated during a token generation time in the token pool and selectively controlling a count value of the first counter, said selective controlling of the count value being in dependence upon said storing of the tokens generated during the token generation time;

detecting the count value of the first counter and detecting a status of the first data buffer;

selectively controlling the maximum size of the first data buffer in dependence upon the count value of the first counter and the status of the first data buffer;

checking the first token buffer and the token pool when at least one occurs selected from among a packet being conveyed to the first data buffer and the packet being stored in the first data buffer;

when the first token buffer does not contain any tokens and the token pool does contain at least one token, transmitting the packet and removing the at least one token from the token pool and controlling the count value of the first counter and controlling the current size of the first data buffer; and when the first token buffer does not contain any tokens and the token pool does not contain any tokens, selectively storing the packet in the first data buffer in dependence upon the count value of the first counter and the status of the first data buffer.

4. The method of claim 3, further comprising transmitting the packet and removing the at least one token from the first token buffer, when the first token buffer does contain at least one token.

5. A method for monitoring traffic in a packet switched network, the method comprising:

providing a plurality of connections for transmitting data in a packet switched network, the connections including at least a first connection;

providing a plurality of token buffers, each one of the token buffers corresponding to a respective one of the connections, each one of the token buffers storing tokens generated by the connection corresponding to the respective token buffer, the first token buffer corresponding to the first connection;

providing a token pool shared by the connections, the token pool storing tokens generated by the connections when the token buffers are filled to their capacity;

providing a plurality of counters, each one of the counters corresponding to a respective one of the connections, each one of the counters counting tokens stored in the token pool by the connection corresponding to the respective counter, the counters including at least a first counter, the first counter corresponding to the first connection and counting tokens stored in the token pool by the first connection;

providing a plurality of data buffers, each one of the data buffers corresponding to a respective one of the connections, each one of the data buffers storing a packet of a connection corresponding to the respective data buffer when a network resource is deficient and the first connection is a contract-following connection, the data buffers including at least a first data buffer, the first data buffer corresponding to the first connection; and when the first token buffer is full and the token pool is not full, storing tokens generated during a token generation time in the token pool and selectively controlling a count value of the first counter, said selective controlling of the count value being in dependence upon said storing of the tokens generated during the token generation time.

6. The method of claim 5, further comprising:
when a first received packet reaches the first connection, checking the first token buffer;
when the first received packet reaches the first connection and the first token buffer does not contain any tokens, checking the token pool; and
when the first received packet reaches the first connection and the first token buffer does not contain any tokens and the token pool does not contain any tokens, selectively storing the first received packet in the first data buffer in dependence upon the count value of the first counter.

7. The method of claim 6, said selective storing of the first received packet in the first data buffer being in dependence upon the count value of the first counter and a status of the first data buffer.

8. The method of claim 5, further comprising:
when a first received packet reaches the first connection, checking the first token buffer;
when the first received packet reaches the first connection and the first token buffer does not contain any tokens, checking the token pool; and
when the first received packet reaches the first connection and the first token buffer does not contain any tokens and the token pool does not contain any tokens, selectively storing the first received packet in the first data buffer in dependence upon a status of the first data buffer.

9. The method of claim 5, further comprising:
when a first received packet reaches the first connection, checking the token pool;
when the first received packet reaches the first connection and the token pool does not contain any tokens, checking the first token buffer; and
when the first received packet reaches the first connection and the first token buffer does not contain any tokens and the token pool does not contain any tokens, selectively storing the first received packet in the first data buffer in dependence upon the count value of the first counter.

10. The method of claim 9, said selective storing of the first received packet in the first data buffer being in dependence upon the count value of the first counter and a status of the first data buffer.

11. The method of claim 5, further comprising:
when a first received packet reaches the first connection, checking the token pool;
when the first received packet reaches the first connection and the token pool does not contain any tokens, checking the first token buffer; and
when the first received packet reaches the first connection and the first token buffer does not contain any tokens and the token pool does not contain any tokens, selectively storing the first received packet in the first data buffer in dependence upon a status of the first data buffer.

12. The method of claim 5, further comprising:
when a first packet is stored in the first data buffer, checking the first token buffer;
when the first packet is stored in the first data buffer and the first token buffer does not contain any tokens, checking the token pool; and
when the first packet is stored in the first data buffer and the first token buffer does not contain any tokens and the token pool does not contain any tokens, selectively storing the first packet in the first data buffer in dependence upon the count value of the first counter.

13. The method of claim 12, said selective storing of the first packet in the first data buffer being in dependence upon the count value of the first counter and a status of the first data buffer.

14. The method of claim 13, further comprising:
when the first token buffer does not contain any tokens and the token pool does contain at least one token, transmitting the packet from the first data buffer, removing the at least one token from the token pool, and controlling a current size of the first data buffer in dependence upon said transmitting of the packet from the first data buffer.

15. The method of claim 14, further comprising:
when the first token buffer does contain at least one token and the token pool does not contain any tokens, transmitting the packet from the first data buffer, removing the at least one token from the first token buffer, and controlling a current size of the first data buffer in dependence upon said transmitting of the packet from the first data buffer.

16. The method of claim 5, further comprising:
when a first packet is stored in the first data buffer, checking the first token buffer;
when the first packet is stored in the first data buffer and the first token buffer does not contain any tokens, checking the token pool; and
when the first packet is stored in the first data buffer and the first token buffer does not contain any tokens and the token pool does not contain any tokens, selectively storing the first received packet in the first data buffer in dependence upon a status of the first data buffer.

17. The method of claim 5, further comprising:
when a first packet is stored in the first data buffer, checking the token pool;
when the first packet is stored in the first data buffer and the token pool does not contain any tokens, checking the first token buffer; and when the first packet is stored in the first data buffer and the first token buffer does not contain any tokens and the token pool does not contain any tokens, selectively storing the first received packet in the first data buffer in dependence upon the count value of the first counter.

18. The method of claim 5, further comprising:
when a first packet is stored in the first data buffer, checking the token pool;
when the first packet is stored in the first data buffer and the token pool does not contain any tokens, checking the first token buffer; and
when the first packet is stored in the first data buffer and the first token buffer does not contain any tokens and the token pool does not contain any tokens, selectively storing the first received packet in the first data buffer in dependence upon a status of the first data buffer.

19. The method of claim 18, further comprising:
when the first token buffer does not contain any tokens and the token pool does contain at least one token, transmitting the packet from the first data buffer, removing the at least one token from the token pool, and controlling a current size of the first data buffer in dependence upon said transmitting of the packet from the first data buffer.

20. The method of claim 19, further comprising:
when the first token buffer does contain at least one token and the token pool does not contain any tokens, transmitting the packet from the first data buffer, removing the at least one token from the first token buffer, and controlling a current size of the first data buffer in dependence upon said transmitting of the packet from the first data buffer.

21. A method for monitoring traffic in a communication network, the method comprising:
generating tokens by a plurality of connections in a communication network, the plurality of connections including at least a first connection;
storing the generated tokens in at least one token buffer selected from among a plurality of token buffers when the at least one token buffer is below a maximum buffer size of the at least one token buffer, each one of the token buffers corresponding to a respective one of the connections, the token buffers including at least a first token buffer, the first token buffer corresponding to the first connection and storing of the tokens generated by the first connection when the first token buffer is below a maximum buffer size;
storing the generated tokens in a token pool when at least one of the token buffers is not below its respective maximum buffer size, the token pool storing the tokens generated by the first connection when the first token buffer is not below the maximum buffer size;
counting the tokens stored in the token pool, said counting being performed by a plurality of counters, each one of the counters corresponding to a respective one of the connections, the counters including at least a first counter, the first counter counting the tokens stored in the token pool by the first connection;
storing traffic units of the connections in a plurality of data buffers, each one of the data buffers corresponding to a respective one of the connections, the data buffers including at least a first data buffer, the first data buffer storing the traffic units of the first connection when a resource of the communication network does not conform to predetermined criteria and the first connection does conform to predetermined traffic parameters;
when the first token buffer is not below the maximum buffer size and the token pool is below a maximum pool size, storing tokens generated by the first connection during a token generation time in the token pool and incrementing a count value of the first counter, said incrementing of the count value of the first counter being in dependence upon said storing of the tokens generated during the token generation time;
detecting the count value of the first counter;
selectively controlling a maximum size of the first data buffer in dependence upon the detected count value of the first counter; and
when a first traffic unit of the first connection is stored in the first data buffer and no tokens are stored in the first token buffer and at least one token is stored in the token pool, transmitting the first traffic unit from the first data buffer and removing the at least one token from the token pool and reducing the current size of the first data buffer and controlling the count value of the first counter, said reducing and controlling being performed in dependence upon said transmitting and removing respectively.

22. The method of claim 21, further comprising:
when a second traffic unit of the first connection is not stored in the first data buffer and no tokens are stored in the first token buffer and no tokens are stored in the token pool, selectively storing the second traffic unit in the first data buffer in dependence upon at least one selected from among the count value of the first counter and a status of the first data buffer.

23. A method for monitoring traffic in a communication network, the method comprising:
generating tokens by a plurality of connections in a communication network, the plurality of connections including at least a first connection;
storing the generated tokens in at least one token buffer selected from among a plurality of token buffers when the at least one token buffer is below a corresponding maximum token buffer size, each one of the token buffers corresponding to a respective one of the connections, the token buffers including at least a first token buffer, the first token buffer corresponding to the first connection and storing of the tokens generated by the first connection when the first token buffer is below a first maximum token buffer size;
storing the generated tokens in a token pool when at least one of the token buffers is not below its respective maximum buffer size, the token pool storing the tokens generated by the first connection when the first token buffer is not below the first maximum token buffer size;
counting the tokens stored in the token pool, said counting being performed by a plurality of counters, each one of the counters corresponding to a respective one of the connections, the counters including at least a first counter, the first counter counting the tokens stored in the token pool by the first connection;
storing traffic units of the connections in a plurality of data buffers, each one of the data buffers corresponding to a respective one of the connections, the data buffers including at least a first data buffer, the first data buffer storing the traffic units of the first connection when a resource of the communication network does not conform to predetermined criteria and the first connection does conform to predetermined traffic parameters;
when the first token buffer is not below the first maximum token buffer size and the token pool is below a maximum pool size, storing tokens generated by the first connection during a token generation time in the token pool and decreasing a count value of the first counter by one;

checking the count value of the first counter and a status of the first data buffer;

when the count value of the first counter is a negative number and a current size of the first data buffer is not below a maximum data buffer size, increasing the maximum data buffer size of the first data buffer by one;

when a particular traffic unit corresponds to a traffic unit selected from among a traffic unit reaching the first connection and a traffic unit stored in the first data buffer, and when no tokens are stored in the first token buffer and at least one token is stored in the token pool, transmitting the particular traffic unit and removing the at least one token from the token pool and increasing the count value of the first counter by one and reducing the maximum data buffer size of the first data buffer by one; and when a certain traffic unit reaches the first connection and no tokens are stored in the first token buffer and no tokens are stored in the token pool and the count value of the first counter is a negative number and the first data buffer is below the maximum data buffer size, storing the certain traffic unit in the first data buffer.

24. The method of claim 23, further comprising:

when the count value of the first counter is a positive number, discarding a traffic unit received at the first connection.

25. The method of claim 23, further comprising:

when the first data buffer is not below the maximum data buffer size, discarding a traffic unit received at the first connection.

26. An apparatus for monitoring traffic in a communication network, the apparatus comprising:

a plurality of connections in a communication network, the plurality of connections generating tokens, the plurality of connections including at least a first connection;

a plurality of processors including at least a first processor, each of the processors corresponding to a respective one of the connections;

a plurality of token buffers, at least one of the token buffers storing the generated tokens when the at least one token buffer is below a maximum buffer size of the at least one token buffer, each one of the token buffers corresponding to a respective one of the connections, the token buffers including at least a first token buffer, the first token buffer corresponding to the first connection and storing of the tokens generated by the first connection when the first token buffer is below a maximum buffer size;

a token pool, the token pool storing the generated tokens when at least one of the token buffers is not below its respective maximum buffer size, the token pool storing the tokens generated by the first connection when the first token buffer is not below the maximum buffer size;

a plurality of counters, the plurality of counters counting the tokens stored in the token pool, each one of the counters corresponding to a respective one of the connections, the counters including at least a first counter, the first counter counting the tokens stored in the token pool by the first connection; and a plurality of data buffers, the data buffers storing traffic units of the connections, each one of the data buffers corresponding to a respective one of the connections, the data buffers including at least a first data buffer, the first data buffer storing the traffic units of the first connection when a resource of the communication network does not conform to predetermined criteria and the first connection does conform to predetermined traffic parameters;

when the first token buffer is not below the maximum buffer size and the token pool is below a maximum pool size, the token pool storing tokens generated by the first connection during a token generation time and the first counter incrementing a count value of the first counter, said incrementing of the count value of the first counter being in dependence upon said storing of the tokens generated during the token generation time;

when a first traffic unit of the first connection is stored in the first data buffer and no tokens are stored in the first token buffer and at least one token is stored in the token pool, the first processor transmitting the first traffic unit from the first data buffer and the at least one token being removed from the token pool and the current size of the first data buffer being reduced and the count value of the first counter being controlled, said reducing and controlling being performed in dependence upon said transmitting and removing respectively.

27. The apparatus of claim 26, further comprising:

means for detecting the count value of the first counter; and means for selectively controlling a maximum size of the first data buffer in dependence upon the detected count value of the first counter.

28. The apparatus of claim 26, when a second traffic unit of the first connection is not stored in the first data buffer and no tokens are stored in the first token buffer and no tokens are stored in the token pool, the second traffic unit being stored in the first data buffer in dependence upon at least one selected from among the count value of the first counter and a status of the first data buffer.

* * * * *